(12) United States Patent
Chase et al.

(10) Patent No.: US 6,210,575 B1
(45) Date of Patent: Apr. 3, 2001

(54) CROSSFLOW FILTER CYCLONE APPARATUS

(75) Inventors: George G. Chase, Wadsworth; Steven C. Schapel, Akron, both of OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/268,113

(22) Filed: Mar. 15, 1999

Related U.S. Application Data

(63) Continuation-in-part of application No. 08/846,598, filed on Apr. 30, 1997, now Pat. No. 5,882,530.

(51) Int. Cl.⁷ ................................................. B01D 21/26
(52) U.S. Cl. ...................... 210/304; 210/295; 210/512.1; 55/337; 55/459.1; 209/12.1; 209/715; 209/725
(58) Field of Search .................................. 210/788, 806, 210/295, 304, 416.1, 510.1, 512.1, 258, 260; 209/1, 715, 725, 120, 337, 459.1, 459.2, 459.3, 459.4, 459.5

(56) References Cited

U.S. PATENT DOCUMENTS

| | | |
|---|---|---|
| 4,048,067 | 9/1977 | Cheng . |
| 4,108,778 | 8/1978 | Lambert et al. ...................... 210/297 |
| 4,306,521 | 12/1981 | Giles ..................................... 123/415 |
| 4,569,759 | 2/1986 | Ben Aim et al. ...................... 210/304 |
| 4,597,871 | 7/1986 | Okouchi et al. ...................... 210/456 |
| 4,639,312 | 1/1987 | Quock et al. ......................... 210/101 |
| 4,909,950 | 3/1990 | Katoh et al. .......................... 210/788 |
| 5,032,293 | 7/1991 | Tuite ..................................... 210/788 |
| 5,078,549 | 1/1992 | Schweiss et al. ..................... 406/173 |
| 5,458,738 | 10/1995 | Chamblee et al. ................... 162/190 |
| 5,478,484 | 12/1995 | Michaluk ............................. 210/788 |

FOREIGN PATENT DOCUMENTS

| | | |
|---|---|---|
| 25 11 632 | 9/1976 | (DE) . |
| 0 093 203 | 11/1983 | (EP) . |
| 2 520 632 | 8/1983 | (FR) . |

*Primary Examiner*—David A. Reifsnyder
(74) *Attorney, Agent, or Firm*—Renner, Kenner, Greive, Bobak, Taylor & Weber

(57) ABSTRACT

An apparatus for separating a suspension, comprising a collection vessel; and a cyclone fixably received within the collection vessel, the cyclone having an inlet for receiving the suspension, a wall having at least a filter medium for separating the suspension into at least two components, and a lower underflow outlet for dispensing one of the two components, wherein the filter medium is porous and in communication with a catalyst, a hydrophillic, or hydrophobic material.

18 Claims, 3 Drawing Sheets

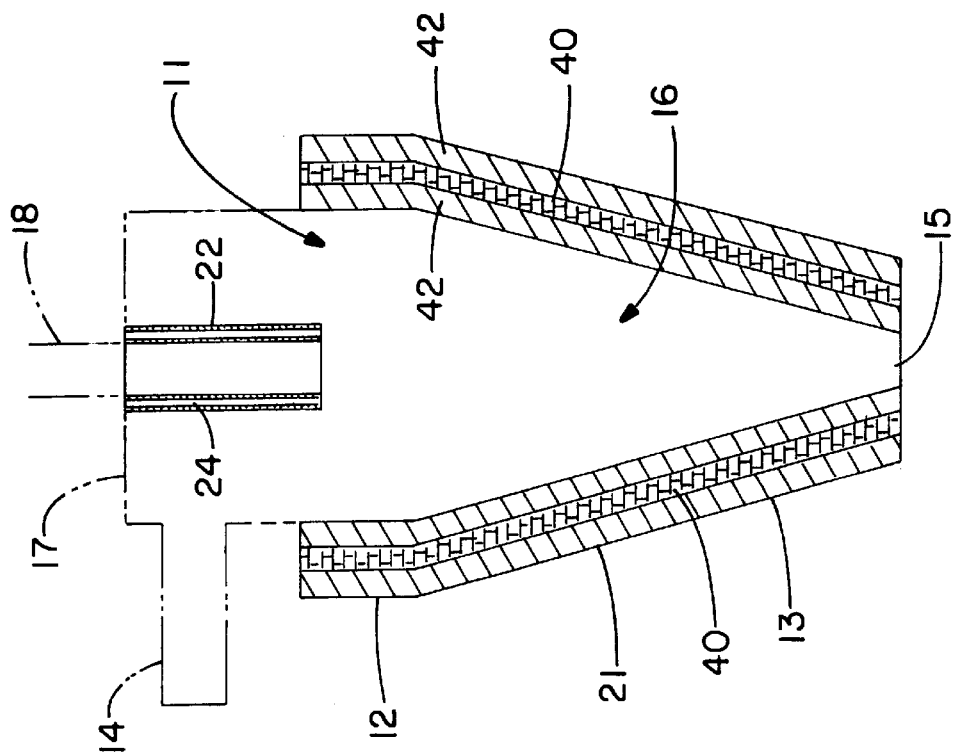
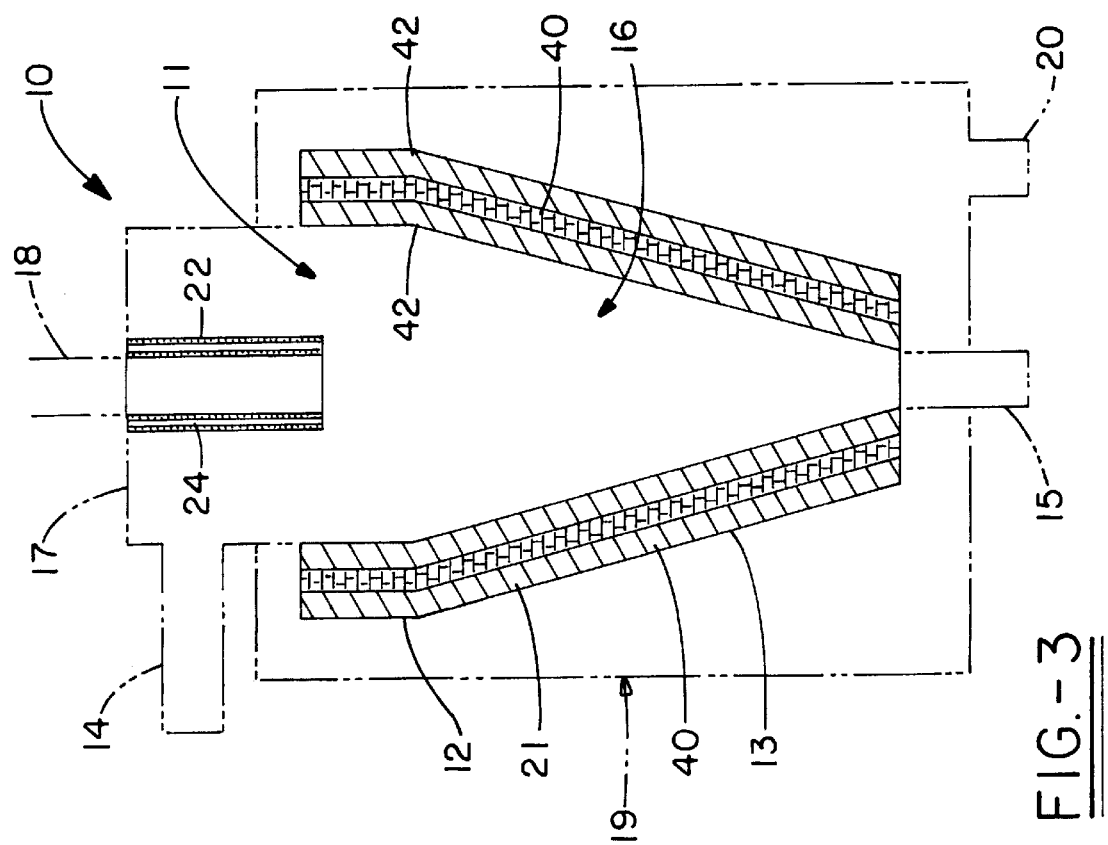

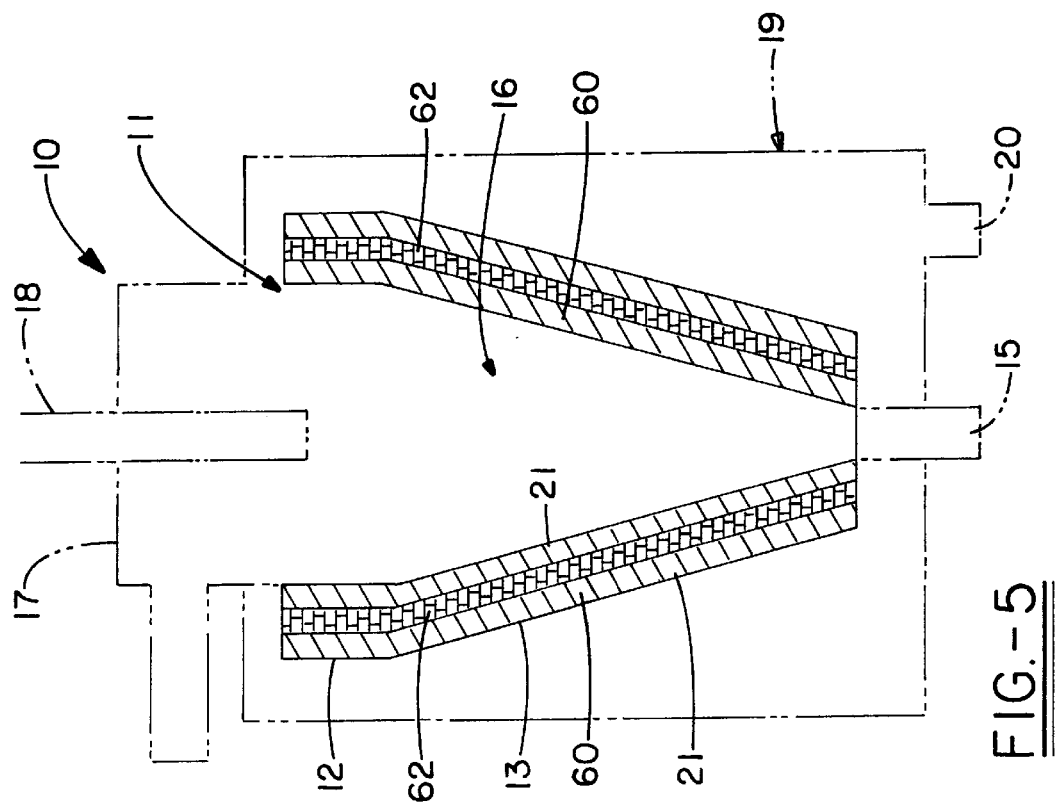
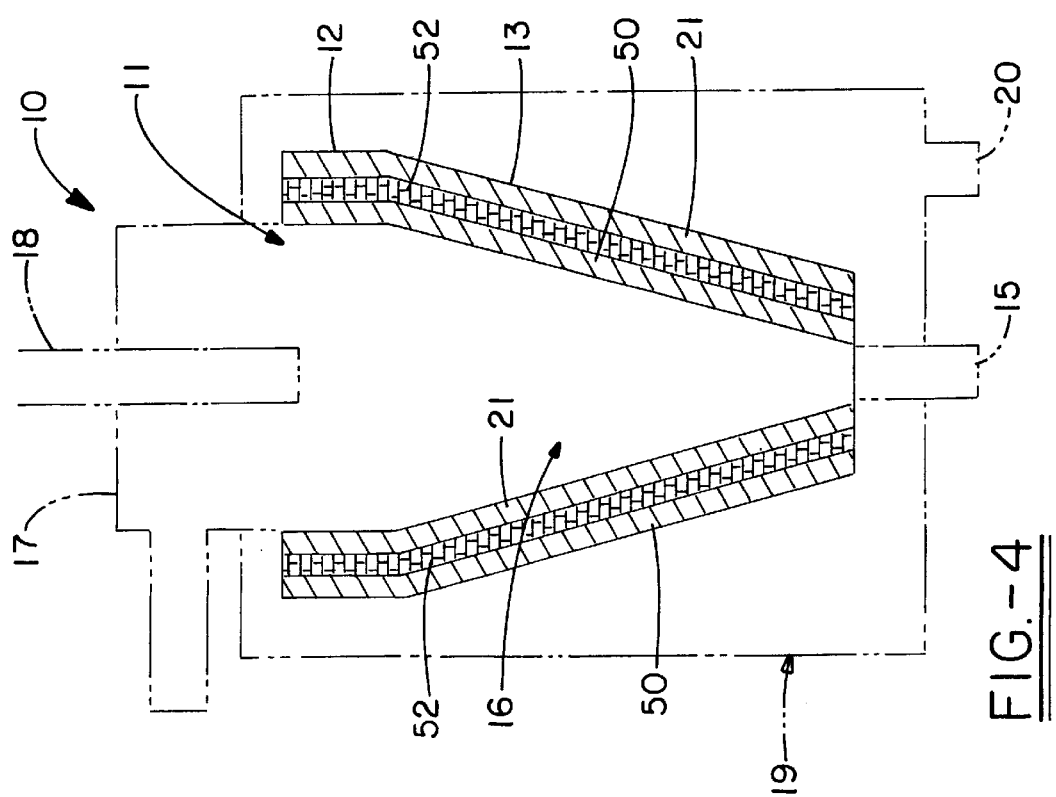

CROSSFLOW FILTER CYCLONE APPARATUS

RELATED APPLICATION

This application is a continuation-in-part of U.S. patent application Ser. No. 08/846,598 filed on Apr. 30, 1997 now U.S. Pat. No. 5,882,530.

GOVERNMENT RIGHTS

This invention was made with government support under a cooperative agreement awarded by Ohio Space Grant Consortium Scholarship. The government may have certain rights to this invention.

TECHNICAL FIELD

The present invention generally relates to a separation apparatus that will separate a suspension of particles into a thickened slurry and a dilute slurry. More particularly, the present invention relates to a cyclone separator having improved separation capabilities over known cyclone separators. Specifically, the present invention relates to cyclone separators having a porous vortex finder and a porous hydrophilic, porous hydrophobic, catalyst, ion exchange, or porous chemically selective absorbative/absorbative wall through which carrier fluid is removed from the apparatus wall through which carrier fluid is removed from the apparatus.

BACKGROUND OF THE INVENTION

A cyclone separator is a common apparatus used to concentrate particles suspended in a carrier fluid. This apparatus, commonly referred to simply as a cyclone, is a frustum-shaped and cylinder-shaped apparatus with a single vertical axis, wherein the large diameter end of the frusto-conical portion is typically oriented directly above the small diameter end, and the cylindrical portion is above the frustum, such that the walls of the cylinder and frustum are contiguous. It is worth noting that although the term "cyclone" is applicable to all three types of suspension systems, "hydrocyclone" is generally limited to liquid-particle and liquid-liquid systems.

For currently known cyclones, a pressure feed provides the necessary potential energy that is converted to rotational motion by introduction through a tangential inlet near the top of the cyclone's upper cylindrical section. The suspension spirals along the outer wall creating centrifugal acceleration on the entrained particles, forcing them outward. As the suspension travels downward it encounters the lower conical section where the suspension accelerates as the cross-sectional area decreases. The degree of separation is based on particle specific gravity, particle size, particle shape, fluid specific gravity, and viscosity.

The centrifugal acceleration in a cyclone plays a decisive role in its ability to classify particles in suspension. A settling particle in a cyclone has three forces in equilibrium acting on it: a centrifugal force from rotational motion; a buoyant force from differences in particle and fluid density; and a drag force from fluid friction. These three forces are functions of velocity, with buoyancy and friction opposing the centrifugal force.

Larger particles will experience a greater centrifugal force and will gravitate towards the outer wall while smaller ones will be drawn into the inner vortex. The majority of these smaller particles are pumped out of the cyclone through an overflow outlet placed in the upper central portion of the cyclone. Some particles in the inner vortex are caught in eddy flows and become remixed with the carrier fluid.

Residence time in the cyclone has to be considered in determining performance. Factors that affect performance can be grouped into two categories. One is operating variables consisting of flow rate and feed composition. Higher flow rates, though lowering residence time, produce higher yields due to increased shear with increased pressure drop, but at the expense of an exponential increase in energy consumptions. The other is design variables associated with geometry that affect efficiency by determining flow patterns and are directly related to frictional and turbulent losses.

Cyclones have several advantages over other separation apparatus. First, they can accommodate and separate large volumes of suspension in a relatively short period of time. Higher capacity or finer fractionation of particulate can be achieved by linking multiple cyclones in parallel or series, respectively. Cyclones can also be used in combination with other separators to enhance thickening or to increase overall mass recovery. Second, cyclones generally do not have filters which are subject to clogging. Third, a cyclone is a simple device that lacks mechanical moving parts; thus, it is relatively easy and inexpensive to manufacture and maintain. On the other hand, one of the main disadvantages of the cyclone is that the separation is not as sharp as compared to filters, for example.

Crossflow filters are also known. These filters provide particulate-free filtrate and the ability to combat, or at least slow down, dead-end filtration, cake growth, which is predominant in fine particulate solution separations, are the major advantages to using crossflow filtration. Ultrafiltration, reverse osmosis, microfiltration, and thickening of solid/liquid solutions using anisotropic membranes, microporous media, and tightly woven material, respectively, are several of the areas that use crossflow filtration.

Typically, crossflow filters consist of two long concentric tubes. The inner tube has a porous stationary media surface and the outer tube is non-porous. A suspension is introduced into the inner tube under pressure. Some of the carrier fluid is then forced out of the inner porous tube into the outer tube, thereby concentrating the suspension within the inner tube. Shear force is developed by flow parallel to a stationary media surface which removes most particulate buildup. Over time, however, a residual cake forms, inhibiting filtrate flux and requiting either a cyclic back flush or another means of media cleaning.

Some manufacturers and research facilities, in an effort to minimize the filtrate flux decline due to cake buildup, have devised high-shear crossflow filters. These filters are necessary for applications where filtrate flux is too low, back washing frequency is excessive, and concentration of particulate is too high for low-shear crossflow filtration to be effective.

Although the separation force is the same for both high-shear and low-shear crossflow filtration, the method of generating the necessary shear is quite different. In low-shear the fluid pressure provides the necessary velocity as the solution is pumped through microporous tubes or between plates utilizing various porous media. High-shear crossflow filtration relies on mechanical rotational energy from either rotating disks or axial filters to impart a large velocity gradient to the fluid that provides the shearing forces eliminating the need for a pump induced pressurized feed. Prototype high-shear filters are designed to allow operation of several separation stages in either parallel or series operation depending on the application. A rotating disc or rotating axial cylinder are the two main geometries of introducing a high shear to a fluid with a filter medium applied to any surface.

Filter flux through the media decreases over time because media blockage occurs by particles smaller than pore size, and a secondary membrane develops which slowly increases in depth and density. Decrease in flux reduces yield and increases downtime due to cleaning or changing filter media. To maximize operation and yield, intricate backwash systems can be designed for the system to remove excessive dynamic membranes that normal aid in separation. This further complicates the design and increases the cost of the already expensive high-shear filter.

Therefore, there is a need for a fixed filtering apparatus that is capable of a high degree of separation, can quickly separate large quantities of suspension, and is inexpensive to manufacture and maintain.

Known cyclone crossflow filtration devices do not provide for catalytic reaction or ion exchange during separation. Therefore, there is a need for a fixed filtering apparatus capable of separation and catalytic reaction that is inexpensive to manufacture and maintain. There is, also, a need for an inexpensive separation and ion exchange apparatus.

In the oil drilling industry, an oil and water solution is brought to the surface during drilling operations. This solution may contain other particles, gases, or fluids. Pumping the water and other contaminants dispersed within this solution adds to the cost of drilling because of the added weight. Therefore, there is a need for a fixed filtering apparatus capable of quickly and inexpensively separating water molecules and other substances in the solution.

SUMMARY OF THE INVENTION

It is therefore an object of the present invention to provide a simple apparatus with improved separation capabilities.

It is another object of the present invention to provide an apparatus that is capable of separating large volumes of suspension in a relatively short period of time.

It is yet another object of the present invention to provide an apparatus that is capable of filtering particles from a suspension using a porous material that will resist caking.

It is a further object of the present invention to provide an apparatus that can separate neutrally buoyant particles from a suspension.

It is another object of the present invention to provide a fixed apparatus with a crossflow filter that has enhanced cross flow filter shear at the filtering surface without mechanical moving parts.

It is yet another object of the present invention to provide an apparatus that is capable of having three outlet streams: one of which is concentrated in particles, another which is dilute in particles, and another which is particle-free.

It is still another object of the present invention to provide a low cost, low maintenance separation apparatus.

It is therefore an object of the present invention to provide a simple apparatus capable of improved separation and catalytic capabilities.

It is yet another object of the present invention to provide a simple apparatus with improved separation and ion exchange capabilities.

It is a further object of the present invention to provide an apparatus that can quickly and efficiently separate water molecules and oil.

It is another object of the present invention to provide an apparatus that has a porous hydrophilic filtering medium.

It is yet another object of the present invention to provide an apparatus that has porous hydrophobic filter medium.

It is still another object of the present invention to provide an apparatus that has a porous catalyst filtering medium.

At least one or more of the foregoing objects, together with the advantages thereof over the known art relating to filtering apparatus, which shall become apparent from the specification which follows, are accomplished by the invention as hereinafter described and claimed.

In general, there is provided an apparatus for separating a suspension, comprising a collection vessel; and a cyclone fixably received within said collection vessel, said cyclone having an inlet for receiving the suspension, a wall having at least a porous section for separating the suspension into at least two components, and a lower underflow outlet for dispensing one of the two components, wherein the other of the two components is received by said collection vessel.

There is also provided a method of separating a suspension comprising the steps of providing a cyclone fixably carried within a vessel, said cyclone having a porous section and an outlet; introducing the suspension into said cyclone through an inlet, wherein the suspension gravitates downwardly toward said porous section; separating the suspension through said porous section into at least two components, wherein one of the components exits through said outlet and the other of the components exits through said porous member into said vessel.

There is also provided a cyclone for separating a suspension comprising a frustoconical body having an upper and a lower portion, an inlet for receiving a suspension, and an outlet for dispensing a thickened slurry, wherein at least a portion of said frustoconical body is porous. Preferably an apparatus for separating a suspension, comprising: a collection vessel; and a cyclone fixably received within said collection vessel, said cyclone having an inlet for receiving the suspension, a wall having at least a porous section for separating the suspension into at least two components, and a lower underflow outlet for dispensing one of the two components, wherein the other of the two components is received by said collection vessel. More preferably a method of separating a suspension comprising the steps of providing a cyclone fixably carried within a vessel, said cyclone having a porous section and an outlet; introducing the suspension into said cyclone through an inlet, wherein the suspension gravitates downwardly toward said porous section; separating the suspension through said porous section into at least two components, wherein one of the components exits through said outlet and the other of the components exits through said porous member into said vessel. Even more preferably a cyclone for separating a suspension comprising a frustoconical body having an upper and a lower portion, an inlet for receiving a suspension, and an outlet for dispensing a thickened slurry, wherein at least a portion of said frustoconical body is porous.

There is also provided an apparatus for separating a suspension, comprising a collection vessel; a cyclone having a plate and an inlet for receiving the suspension; the cyclone defining a hollow axial core; a wall extending from the plate having a porous section a lower underflow outlet; and an upper overflow outlet extending through the plate into the hollow axial core. Even more preferably the present invention therefore provides an apparatus for separating a suspension, comprising a collection vessel housing a cyclone having a plate, a cylindrical wall extending from the plate, and a truncated frustoconical wall extending from the cylindrical wall, the truncated frustoconical wall having a tip wherein the tip of the truncated frustoconical wall defines an exit orifice; wherein the walls define a hollow axial core, the walls having a porous section in communication with the collection vessel for separating the suspension into a carrier fluid, a thickened slurry, and a dilute slurry, wherein the frustoconical wall is porous and wherein at least a portion of the cylindrical wall is porous; a catalyst disposed within the porous section, such that the carrier fluid reacts with the catalyst as it passes through the porous section before it is received by the collection vessel; a filtrate outlet formed within the collection vessel for dispensing the carrier fluid from the collection vessel; a lower underflow outlet, for dispensing the thickened shiny, extends through the collection vessel communicating with the exit orifice; an overflow orifice formed within the plate; a porous upper overflow shaft for dispensing the dilute slurry extending from the plate into the hollow axial region and is in communication with the overflow orifice and the hollow axial region. Even more preferably an apparatus for separating a suspension, comprising a cyclone having an inlet for receiving the suspension; a wall having a porous section and a catalyst section and the wall defining a hollow axial core.

There is also provided an apparatus for separating a suspension, comprising: a collection vessel; a cyclone having a plate and an inlet for receiving the suspension; the cyclone defining a hollow axial core; a wall extending from the plate having a filter medium; a lower underflow outlet; and a vortex finder extending through the plate into the hollow axial core.

There is also provided an apparatus for separating a suspension, comprising: a collection vessel; a cyclone having a plate, a cylindrical wall extending from the plate, and a truncated frustoconical wall extending from the cylindrical wall, the truncated frustoconical wall having a tip wherein the tip of the truncated frustoconical wall defines an exit orifice; wherein the walls define a hollow axial core, the walls having a filter medium in communication with the collection vessel for separating the suspension into a carrier fluid, a thickened slurry, and a dilute slurry; wherein the frustoconical wall is porous and wherein at least a portion of the cylindrical wall is porous; a filtrate outlet formed within the collection vessel for dispensing the carrier fluid from the collection vessel; a lower underflow outlet, for dispensing the thickened slurry, extends through the collection vessel communicating with the exit orifice; an overflow orifice formed within the plate; a porous vortex finder defining a channel for dispensing the dilute slurry extending from the plate into the hollow axial region and is in communication with the overflow orifice and the hollow axial region.

There is also provided an apparatus for separating a suspension, comprising a cyclone having an inlet for receiving the suspension, a wall having a filter medium the wall defining a hollow axial core.

BRIEF DESCRIPTION OF THE DRAWINGS

FIG. 3 is a cross-sectional view of another embodiment of the preferred cyclone having a porous-catalyst filter medium according to the present invention.

FIG. 3a is a cyclone apparatus without a collection vessel.

FIG. 4 is a cross-sectional view of yet another embodiment of the preferred cyclone having a porous-hydrophillic filter medium according to the present invention.

FIG. 5 is a cross-sectional view of still another embodiment of the preferred cyclone having a porous hydrophobic filter medium according to the present invention.

PREFERRED EMBODIMENT FOR CARRYING OUT THE INVENTION

The present invention is generally directed toward a separation apparatus that is a cyclone. In most applications, as will be discussed hereinbelow, the cyclone is used in conjunction with a collection vessel. As can be appreciated, the cyclone apparatus can operate without a collection vessel, and, thus, any discussion of the cyclone apparatus with a collection vessel should not be viewed as limiting. The embodiment in FIG. 3a shows a cyclone apparatus without a collection vessel.

Cyclones, in general, separate suspensions by using a combination of centrifugal and gravitational forces as a suspension spirals down a frustoconical surface. The cyclone of the present invention, however, further separates the suspension by simultaneously filtering the suspension. The suspension, therefore, is separated into various components including a thickened slurry, a dilute slurry, and a filtrate as a result of both cyclone separation and filtering.

For purpose of describing the present invention, the suspension to be separated will be discussed to as including suspended particles within a carrier fluid. But, the suspension should not be so limited because many suspensions can be separated by using the apparatus and methods of this invention.

Figure 1:
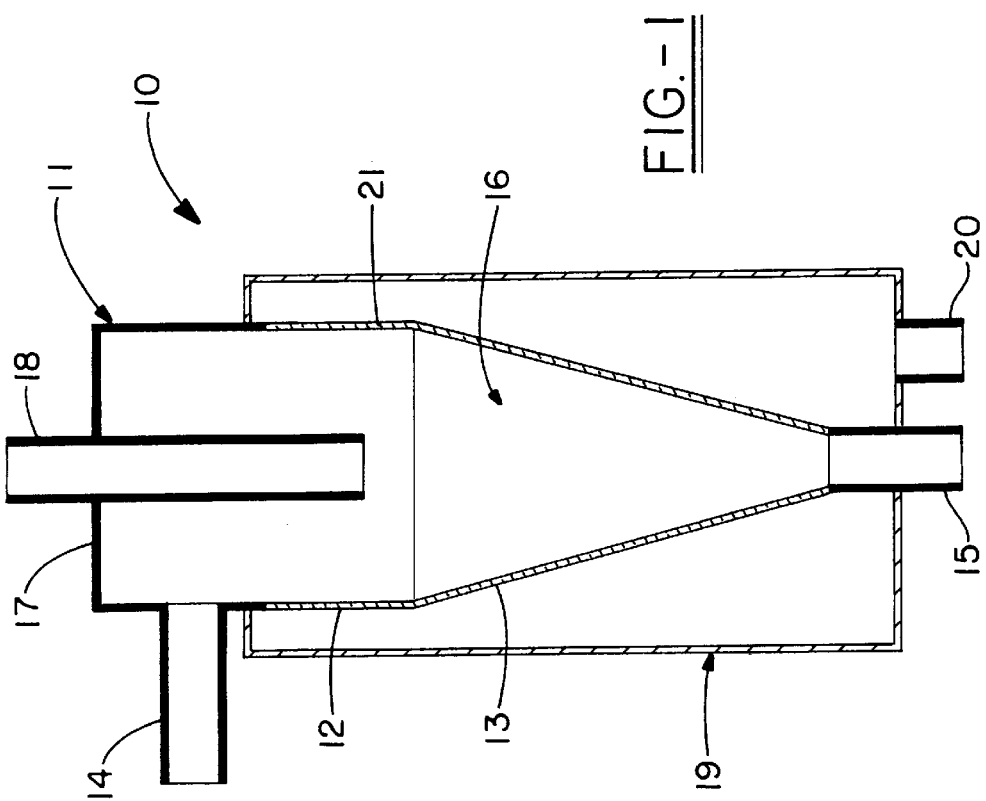
FIG. 1 is a cross-sectional view of a preferred cyclone according to the present invention.

The present invention is best described with reference to the figures. Although the figures are relied on for explanation of the present invention, the present invention should not be limited thereto. With reference to FIG. 1, a fixed crossflow filter cyclone apparatus 10 is depicted; this includes a cyclone 11 and an collection vessel 19. Cyclone 11 has an upper cylindrical surface 12, a lower frustoconical surface 13, an inlet 14, a lower underflow outlet 15, a hollow axial core 16, and an optional lid 17. Lid 17 may also contain an upper overflow outlet 18, which may be attached to a pump.

As shown in FIG. 3, upper overflow outlet 18 can be provided with porous walls 22. A channel 24 is formed within porous wall 22, and as the dilute slurry rises an additional filtration step occurs as the fluid passes through the porous wall 22 and leaves via cavity 24. The upper overflow outlet 18 is shown as a tubular structure, but it should be understood that it can be of any shape. For example, a solid member that is porous could be attached to a pump that would draw the dilute slurry through the porous solid member.

Lower surface 13 and upper surface 12 contain filter areas that preferably form a single filter surface. It is preferred that filter surface include all of lower surface 13 and part of upper surface 12, schematically represented in FIG. 1 as cross-hatched lines. It should be appreciated that the present invention could be practiced where only a portion of lower surface 13 is a filter area.

Separation is accomplished when a suspension enters the cyclone 11 via inlet 14, which is located near the top of, and tangential to, upper surface 12. Upper surface 12 is preferably cylindrical so as to prevent the in-flow of suspension from flowing initially upward thereby disrupting the spiral path, which will be described below in further detail. Nonetheless, a cyclone without cylindrical surface 12 is contemplated.

A wide variety of materials can be used to fabricate the various components of the apparatus of the present invention. The preferred materials will depend in part on the type of suspension to be separated, as well as durability and cost considerations. As one of ordinary skill would appreciate, if the suspension is gritty, for example, a material is required that will stand up to the scouring forces of a gritty suspension under pressure. Steel or ceramic would be preferred for the separation of a gritty suspension. For a liquid-liquid suspension, however, the cyclone could simply be made from plastics. One specific example envisioned is the use of plexiglass for a non-porous portion of the cyclone and polypropylene for a porous portion.

In one embodiment of the present invention, the filter surface area includes a filter medium 21. As shown in FIG. 1, the filter medium 21 is a made of a porous material. The size of the pores of the porous material can be of any size, depending on the size of the particles to be separated. Ideally, the pores should be sufficiently small to prevent particles from penetrating the walls, yet large enough to maximize the rate at which the carrier fluid can exit the cyclone. Although it is envisioned that most applications would require a pore size of about 1 micron to about 20 microns, smaller or larger pores are also possible. Preferably, the pore size is from about 1.5 to about 10 microns and more preferably, from about 2 to about 5 microns.

Likewise, the dimension of the cyclone can vary, depending on the rate and degree of desired separation. Typically, a larger cyclone is capable of separating a given volume of suspension faster than a smaller one. Other factors, however, are also important in determining the in-flow and out-flow capacities of the cyclone. The exit flow rate capacity depends primarily on the diameter of the outlet or pore. The entering flow rate capacity depends primarily on the cone angle—the angle between the cone wall and the cone axis—and the exit flow rate. The entering flow rate can be as great as 100 gallons per minute or more. Flow rates of about 1 to about 20 gallons per minute are typical.

There is a wide range of feasible cone angles, but typically the angle will be about 2° to about 20°. In most situations, the preferred angle will be about 5° to about 15°. In addition to affecting flow rates, as described above, one skilled in the art will appreciate that the smaller the cone angle, the more times the majority of particles pass around the frustum before exiting via outlet 15. Consequently, a smaller cone angle results in better separation.

It is envisioned that the present invention will typically be about the same general size as those currently found in industry. For example, a cyclone having a height from about 12 to about 18 inches and a diameter from about 1 to about 3 inches is envisioned for liquid-particle separations.

Figure 2:
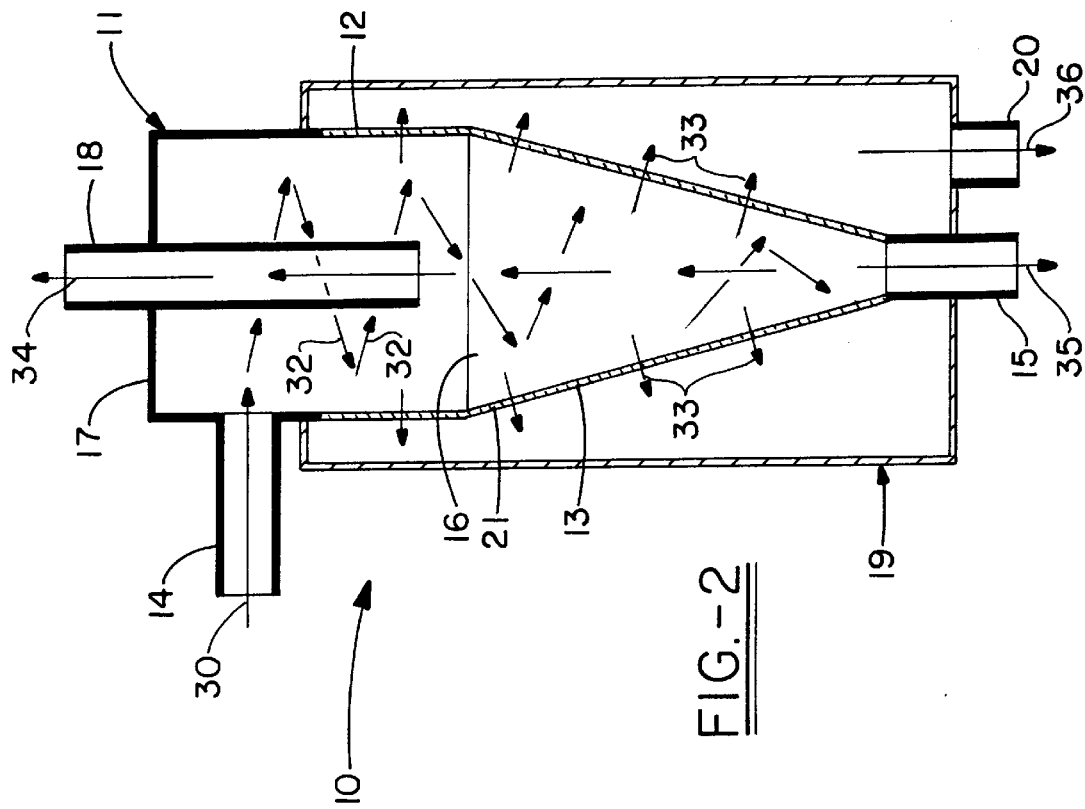
FIG. 2 is a cross-sectional view of a preferred cyclone according to the present invention with arrows indicating directions of flow.

As indicated by the arrow 30 in FIG. 2, the suspension to be separated is pumped through inlet 14. Due to the configuration of the apparatus, the suspension is subject to centrifugal (outward) and gravitational forces and therefore follows a downward spiral path. The particles concentrate along the inner walls of the apparatus as a result of centrifugal forces, here, the particles have a tendency to clump together or to adhere to the porous walls. This clump formation, or caking, can impede the exit of carrier fluid through the porous walls. Therefore, it is preferred that the inlet flow rate be sufficiently high to maintain shearing forces on the lower surface to prevent cake formation from blocking the pores of the porous material.

Areas susceptible to cake formation can be determined by using computational fluid dynamics software, such as that acquired from AEA Technology. This software will determine the relative magnitudes of fluid velocity gradients, which are proportional to the respective shear forces at various points along porous wall 21. From this information, the optimal locations for the porous material with the least likelihood of cake formation can be determined for any set of parameters. Accordingly, one skilled in the art, without undue experimentation, will be able to determine the optimal flow rate needed for any given cyclone according to the present invention.

The particles concentrated on the inner walls displace the carrier fluid inward and upward. The result is that the majority of particles follow a spiral path as indicated by the arrow 32 in FIG. 2, and the majority of the carrier fluid follows one of the paths indicated by the arrow 33. Some of the carrier fluid, however, will remain in the thickened slurry and exit the cyclone via lower underflow outlet 15, as indicated by the arrow 35. In addition, some carrier fluid will optionally exit the cyclone as a dilute slurry through overflow outlet 18, as indicated by the arrow 34.

When the suspension reaches filter medium 21, the carrier fluid flows through the filter material into collection vessel 19, as indicated by the arrow 33, thereby thickening the slurry remaining in the cyclone. Vessel 19 is placed over filter medium 21 and contains a filtrate outlet 20 that can be connected to a pump to increase the flow indicated by the arrow 33. The filtrate then exits vessel 19 via filtrate outlet 20, as indicated by the allow 36. The degree of separation will depend on the particle's specific gravity, size and shape and the carrier fluid's specific gravity and viscosity.

In another embodiment of the present invention, the filter medium 21 is a porous catalyst. With reference to FIG. 3, the filter medium 21 includes a catalyst 40 dispersed within the porous wall represented by rectangular hatching. In FIG. 3, the catalyst 40 is inserted between two porous layers 42. This arrangement protects the catalyst from the fluid flow within the hollow axial core 16. The catalyst 40 may also be dispersed within a porous wall or adjacent to the porous wall. In all cases, the catalyst 40 is in fluid communication with the porous material 42 and thus hollow axial core 16. As the carrier fluid passes through the porous material 42 the catalyst 40 will have some impact on the carrier fluid, for example, a chemical reaction can take place. In this way, the cyclone apparatus 10 can perform separation and reaction functions simultaneously.

FIG. 4 shows yet another embodiment of the present invention. The fixed cross flow filter cyclone apparatus 10 includes a cyclone 11 having an upper cylindrical surface 12 and a lower frusto conical surface 13, an inlet 14, a lower under flow outlet 15, a hollow axial core 16, an optional lid 17, and a porous hydrophobic filter medium 50. A hydrophobic material 52, represented by rectangular hatching, is dispersed within porous material to aid in separating water molecules contained within the suspension. The hydrophobic material 52 may be arranged either as a layer between porous layers, as above, or it may be dispersed within the porous material or placed adjacent to the porous material. As above, separation is accomplished when a suspension enters the cyclone 11 via inlet 14, and contacts upper surface 12. The suspension begins a downward spiral through the hollow axial core 16, and comes into contact with the porous hydrophobic filter medium 50. As the suspension begins to permeate the porous material, the hydrophobic material 52 will reject any water molecules. The remaining carrier fluid will exit the outside of filter medium 50. In a similar manner, a porous hydrophilic filter medium 60, FIG. 5, can be used allowing water molecules within the separation to pass. With reference to FIG. 5, as the separation spirals through the hollow axial core 16, and it contacts porous hydrophillic filter medium 60. Porous hydrophillic filter medium 60 accepts water molecules within the separation, and allows them to pass as part of the carrier fluid exiting the outside of the cyclone 11.

The hydrophobic porous 50 or hydrophilic porous 60 filter media are particularly useful for separating water molecules trapped within oil and similar petroleum resources as they are pumped from a well. Or, alternatively, these media can be used to separate oil molecules trapped within water. A further advantage of the hydrophillic porous and hydrophobic media is to their ability to separate water molecules trapped within a gas, for example, water molecules trapped in natural gas.

It should be noted that all reference to suspensions or slurries and the like is intended to apply to gas-particle as well as liquid-particle suspension systems. Also, in this specification, a liquid-particle suspension system is intended to include a liquid-liquid system containing more than one immiscible liquid.

Therefore, it should be appreciated that the cyclone of the present invention is able to take a suspension of particles and separate it into a highly concentrated slurry of particles, a particle-free filtrate, and, optionally, a dilute slurry of particles. The present invention achieves enhanced crossflow fluid shear at the filtering surface without mechanical moving parts. This enables the cyclone to separate particles without caking. The present invention also achieves an increase in velocity of the thickened slurry via a converging flow cross sectional area. Further, the present invention is able to separate neutrally buoyant particles from the suspension because it does not rely totally on a density difference for the separation. Still further, it should be appreciated that the cyclone of the present invention is able to perform catalytic reaction or ion exchange simultaneously with particle separation. The cyclone of the present invention, also, is able to efficiently separate water molecules within a suspension.

Based upon the foregoing disclosure, it should now be apparent that the cyclone described herein will carry out the objects set forth hereinabove. It is therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. An apparatus for separating a suspension, comprising:
   a collection vessel;
   an inlet for receiving the suspension; a cyclone in communication with said inlet said cyclone having a frusto conical wall;
   said wall including a filter medium and a catalyst section in communication with the filter medium, said wall defining a hollow axial core;
   a lower underflow outlet in communication with the hollow axial core; and
   a vortex finder extending into the hollow axial core.

2. An apparatus as in claim 1 wherein the vortex finder outlet is porous.

3. An apparatus as in claim 1 wherein the filter medium is porous.

4. An apparatus for separating a suspension, comprising:
   1) a collection vessel;
   2) a cyclone having a plate, a cylindrical wall extending from the plate, and a truncated frustoconical wall extending from the cylindrical wall, the truncated frustoconical wall having a tip wherein the tip of the truncated frustoconical wall defines an exit orifice;
      a) wherein the walls define a hollow axial core, the walls having a filter medium in communication with the collection vessel for separating the suspension into a carrier fluid, a thickened slurry, and a dilute slurry;
      b) wherein the frustoconical wall is porous and wherein at least a portion of the cylindrical wall is porous;
   3) a filtrate outlet formed within the collection vessel for dispensing the carrier fluid from the collection vessel;
   4) a lower underflow outlet, for dispensing the thickened slurry, extends through the collection vessel communicating with the exit orifice;
   5) an overflow orifice formed within the plate;
   6) a porous vortex finder defining a channel for dispensing the dilute slurry extending from the plate into the hollow axial region and is in communication with the overflow orifice and the hollow axial region.

5. An apparatus as in claim 4 wherein the filter medium is a porous catalyst for reacting with the carrier fluid.

6. An apparatus as in claim 4 wherein the filter medium is a porous hydrophobic material.

7. An apparatus as in claim 4 wherein the filter medium is a porous hydrophillic material.

8. The apparatus as in claim 4 further comprising a pump connected to the channel.

9. An apparatus for separating a suspension, comprising:
   a cyclone having
      an inlet for receiving the suspension; and
      a wall having a filter medium and a reactive material selected from the group consisting of a catalyst material, a hydrophillic material and a hydrophobic material, wherein said wall defines a hollow axial core.

10. An apparatus as in claim 9 wherein the cyclone defines an underflow orifice, the cyclone has a lid, wherein the lid defines an overflow orifice; and an upper overflow outlet in communication with the overflow orifice extending from the lid into the hollow axial core.

11. An apparatus as in claim 10 wherein the upper overflow outlet is a solid porous member.

12. An apparatus as in claim 11 wherein the upper overflow outlet is a hollow porous tube.

13. An apparatus as in claim 11 wherein the outlet porous section extends into the hollow axial core.

14. An apparatus as in claim 9 further comprising a lower underflow outlet for dispensing the thickened slurry, and an upper overflow outlet for dispensing the dilute slurry.

15. An apparatus as in claim 9 wherein the filter medium has a porous section.

16. An apparatus as in claim 15 wherein the reactive material is adjacent to the porous section.

17. An apparatus as in claim 16 wherein the reactive material is dispersed within the porous section.

18. An apparatus as in claim 15 wherein the porous section has two layers sandwiching the reactive material.

* * * * *